United States Patent
Fassolette

(10) Patent No.: US 10,817,006 B2
(45) Date of Patent: Oct. 27, 2020

(54) MIXING UNIT AND MIXER TAP COMPRISING SUCH A MIXING UNIT

(71) Applicant: VERNET, Ollainville (FR)

(72) Inventor: Pierre-Olivier Fassolette, Corbeil Essonnes (FR)

(73) Assignee: VERNET, Ollainville (FR)

( * ) Notice: Subject to any disclaimer, the term of this patent is extended or adjusted under 35 U.S.C. 154(b) by 78 days.

(21) Appl. No.: 16/096,691

(22) PCT Filed: Apr. 25, 2017

(86) PCT No.: PCT/EP2017/059708
§ 371 (c)(1),
(2) Date: Oct. 25, 2018

(87) PCT Pub. No.: WO2017/186665
PCT Pub. Date: Nov. 2, 2017

(65) Prior Publication Data
US 2019/0138038 A1    May 9, 2019

(30) Foreign Application Priority Data

Apr. 26, 2016  (FR) ...................................... 16 53676

(51) Int. Cl.
*G05D 23/13*     (2006.01)
*E03C 1/02*      (2006.01)
(Continued)

(52) U.S. Cl.
CPC ........... *G05D 23/1353* (2013.01); *E03C 1/02* (2013.01); *F16K 11/0787* (2013.01); *F16K 31/002* (2013.01); *E03C 2001/026* (2013.01)

(58) Field of Classification Search
CPC .. G05D 23/13; G05D 23/132; G05D 23/1353; G05D 23/134; F16K 11/0787; F16K 19/006; F16K 31/002; E03C 1/02
See application file for complete search history.

(56) References Cited

U.S. PATENT DOCUMENTS

| | | |
|---|---|---|
| 3,248,056 A | 4/1966 | Obermaier |
| 3,409,039 A | 11/1968 | Griffin |
| | (Continued) | |

FOREIGN PATENT DOCUMENTS

| | | |
|---|---|---|
| CN | 1262384 A | 8/2000 |
| CN | 1423735 A | 6/2003 |
| | (Continued) | |

OTHER PUBLICATIONS

International Search Report issued by the International Searching Authority in International Application No. PCT/EP2017/059716, dated Aug. 4, 2017, 4 pages total.

(Continued)

*Primary Examiner* — Marc E Norman
(74) *Attorney, Agent, or Firm* — Troutman Pepper Hamilton Sanders LLP

(57) ABSTRACT

The mixing unit for a mixer tap has a generally cylindrical shape defining a main axis and comprising a first intake of a first incoming stream of fluid having a first temperature, a second intake of a second incoming stream of fluid having a second temperature greater than the first temperature, an outlet for an outgoing stream, means for mixing the first and second incoming streams to form the outgoing stream, and thermostatic means which comprise a portion that is mobile in translation along a shutter axis. According to the invention, a plane that is orthogonal to the main axis and the shutter axis intersect, wherein the shutter axis is inclined with respect to this orthogonal plane, and passes through it so that the mixing unit, while being easy to manufacture, has sufficient compactness to accommodate most existing mixer taps.

9 Claims, 5 Drawing Sheets

(51) Int. Cl.
  *F16K 11/078* (2006.01)
  *F16K 31/00* (2006.01)

(56) References Cited

U.S. PATENT DOCUMENTS

| | | | |
|---|---|---|---|
| 4,257,553 | A | 3/1981 | Sliger |
| 4,283,823 | A | 8/1981 | Buswell |
| 4,630,770 | A | 12/1986 | Sliger |
| 4,691,861 | A | 9/1987 | Sliger |
| 4,760,953 | A | 8/1988 | Trubert |
| 4,763,834 | A | 8/1988 | Duprez |
| 5,549,244 | A | 8/1996 | Kai |
| 5,603,485 | A | 2/1997 | Schwarz |
| 5,899,378 | A | 5/1999 | Hainle |
| 8,028,926 | B2 | 10/2011 | Heldberg et al. |
| 8,028,936 | B2 | 10/2011 | McDermott |
| 9,133,942 | B2 | 9/2015 | Ito |
| 2002/0059906 | A1 | 5/2002 | Friesenhahn |
| 2002/0130189 | A1 | 9/2002 | Mace et al. |
| 2007/0261738 | A1* | 11/2007 | Mace ............ F16K 31/002 137/468 |
| 2008/0135633 | A1 | 6/2008 | Heldberg |
| 2009/0025809 | A1 | 1/2009 | Oh |
| 2010/0077583 | A1 | 4/2010 | Takaya |
| 2010/0089467 | A1 | 4/2010 | Bouloy |
| 2010/0230504 | A1 | 9/2010 | Pottie |
| 2011/0198518 | A1 | 8/2011 | Habermann |
| 2013/0112763 | A1 | 5/2013 | Roman |
| 2013/0126624 | A1 | 5/2013 | Park |
| 2013/0180477 | A1 | 7/2013 | Nakajima |
| 2013/0200167 | A1 | 8/2013 | Auweder |
| 2013/0264393 | A1 | 10/2013 | Onishi |
| 2013/0334324 | A1 | 12/2013 | Ruga |
| 2014/0345711 | A1 | 11/2014 | Ueno |
| 2016/0108797 | A1 | 4/2016 | Palumbo |
| 2016/0333767 | A1 | 11/2016 | Pattie |
| 2018/0059693 | A1* | 3/2018 | Rodriguez ............ F16K 31/602 |
| 2018/0223508 | A1* | 8/2018 | Fassolette ............ E03C 1/041 |

FOREIGN PATENT DOCUMENTS

| | | |
|---|---|---|
| CN | 101035954 A | 9/2007 |
| CN | 201763433 U | 3/2011 |
| CN | 102536417 A | 7/2012 |
| DE | 197 16 307 A1 | 10/1998 |
| DE | 10 2005 001303 A1 | 7/2006 |
| EP | 1 020 671 A2 | 7/2000 |
| EP | 2335127 B1 | 3/2012 |
| FR | 2 841 348 A1 | 12/2003 |
| FR | 2876433 A1 | 4/2006 |
| FR | 3003046 A1 | 9/2014 |
| WO | 97/2194 A1 | 6/1997 |
| WO | 2005/124495 A1 | 12/2005 |
| WO | 2014135614 A2 | 9/2014 |
| WO | 2015086749 A1 | 6/2015 |

OTHER PUBLICATIONS

International Search Report issued by the International Searching Authority in International Application No. PCT/EP2017/059708, dated Aug. 1, 2017, 3 pages total.
Rapport De Recherche Préliminaire issued in corresponding French Patent Application No. 1653676 dated Jan. 5, 2017 (in French).
French Search Report for Application No. FR 1656965 dated Mar. 15, 2017.
International Search Report and Written Opinion for Application No. PCT/EP2017/068407 dated Sep. 12, 2017.
International Search Report dated Jul. 4, 2016 during the prosecution of International Application No. PCT/EP2016/056547.
International Search Report dated Mar. 1, 2017 during the prosecution of PCT/EP2016/079878.
First Office Action issued in corresponding Chinese Patent Application No. 201780032082.X dated Jun. 11, 2020.

* cited by examiner

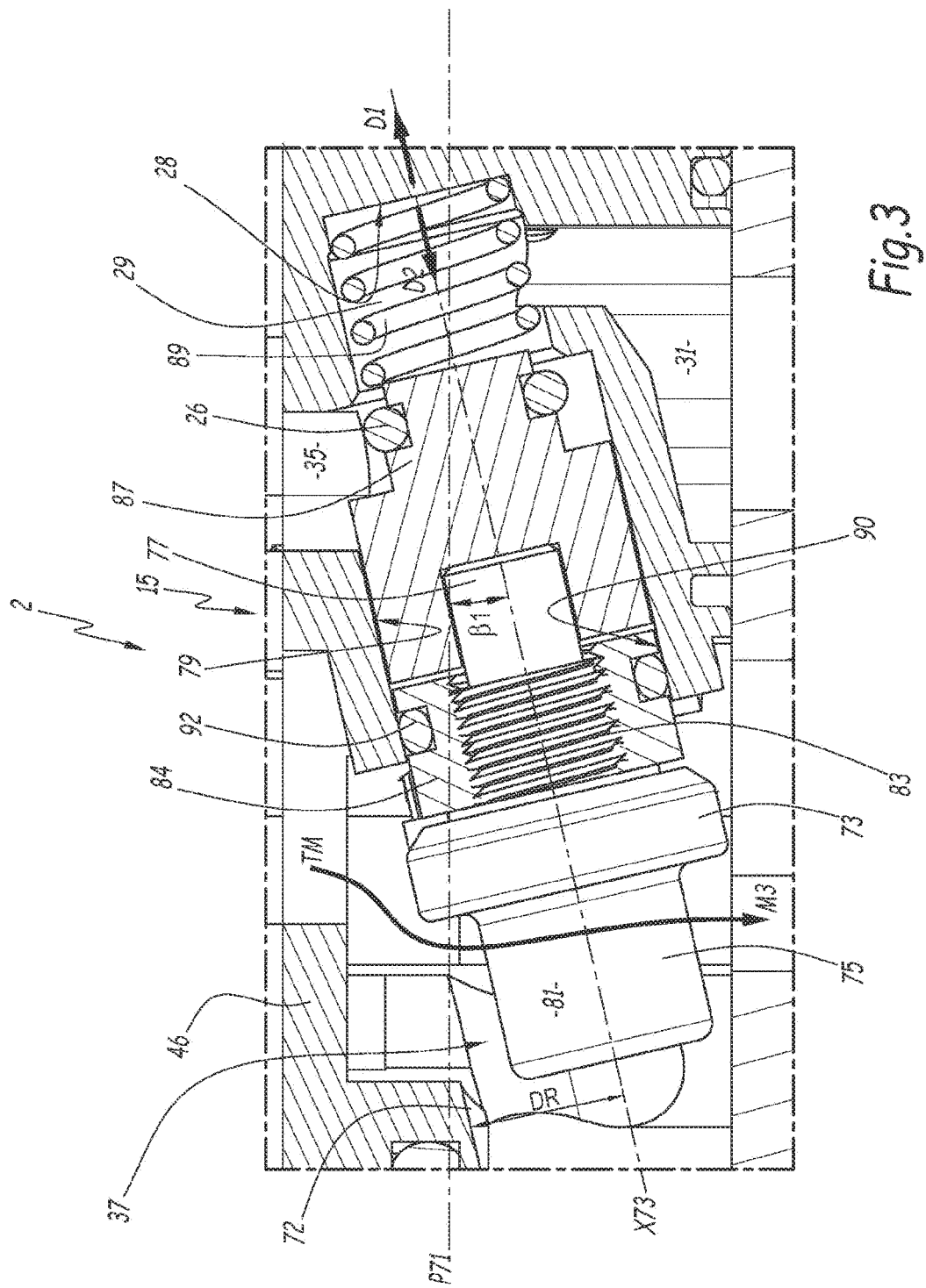

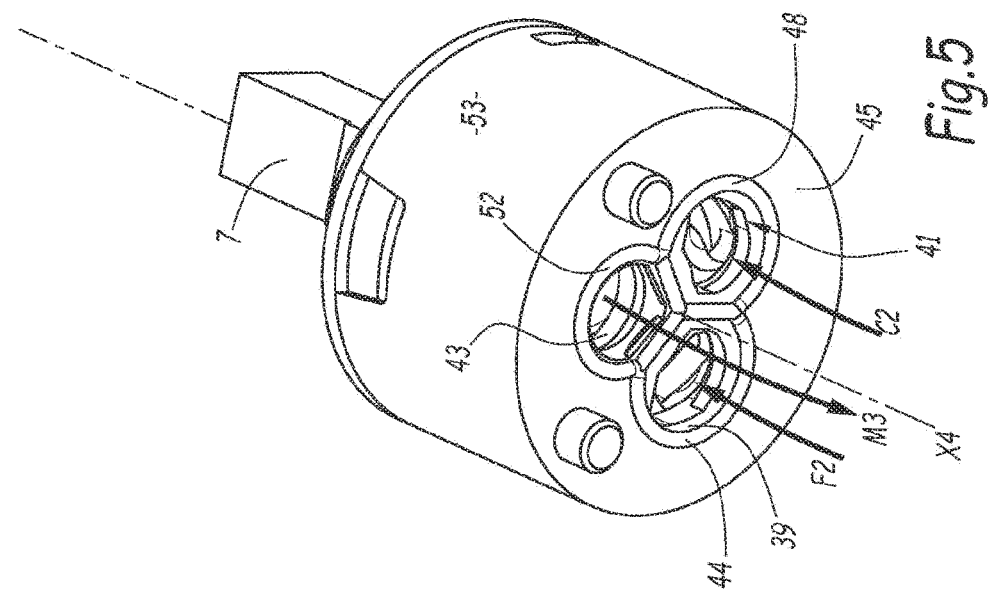
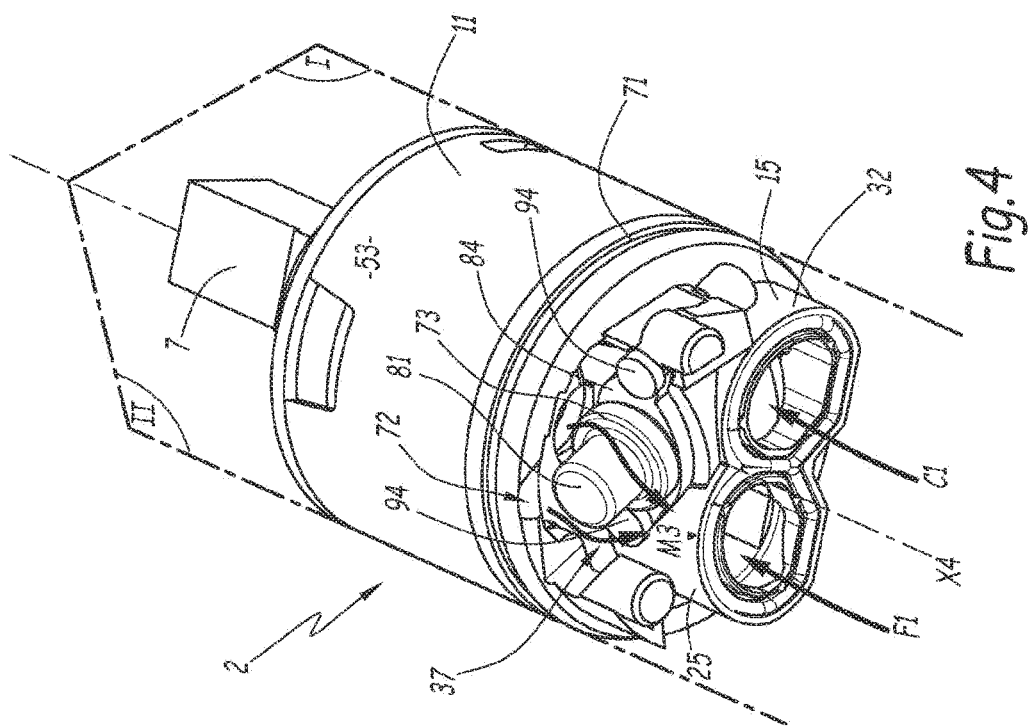

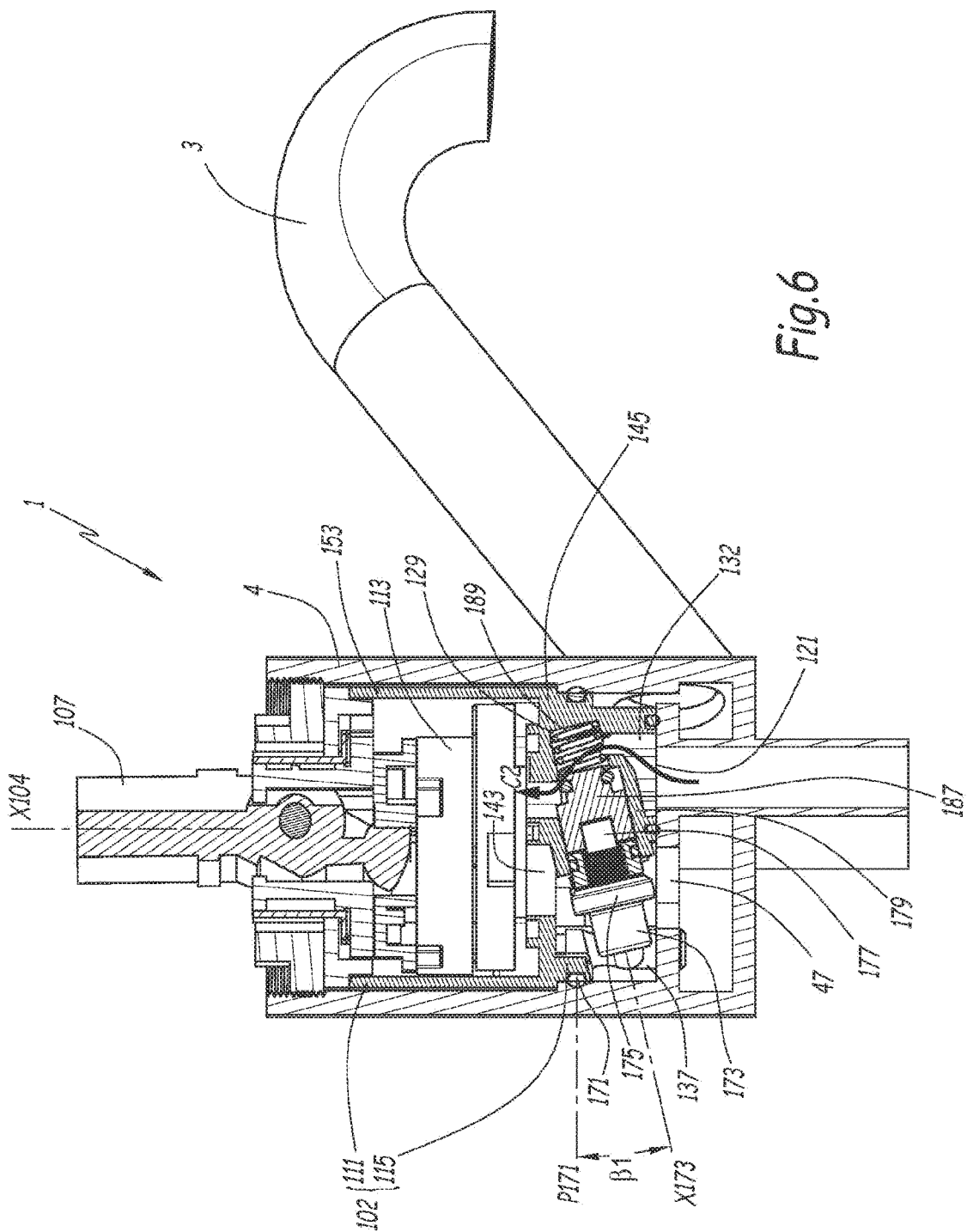

MIXING UNIT AND MIXER TAP COMPRISING SUCH A MIXING UNIT

CROSS-REFERENCE TO RELATED APPLICATIONS

This is a U.S. national phase application under 35 U.S.C. § 371 of International Patent Application No. PCT/EP2017/059708, filed Apr. 25, 2017, which claims priority to French Application No. FR 1653676, filed Apr. 26, 2016. The entire contents of these applications are hereby incorporated by reference.

FIELD OF THE INVENTION

The present invention relates to a mixing unit and a mixer tap comprising such a mixing unit.

The invention relates to the field of sanitary taps. In particular, so-called "mixer" taps that make it possible to emit a mixed stream of running water by mixing a stream of hot water and a stream of cold water within a cartridge mounted in the body of the tap. The respective flow rates of the cold water and hot water streams admitted into the cartridge may be adjusted by means of a control lever, wherein adjustment of the temperature of the mixed stream may be effected by rotation of the lever about one axis, and the flow rate of the mixed stream by rotation of the lever about a second axis.

BACKGROUND

In most cases, the cartridge comprises a pair of perforated ceramic discs, wherein one is fixed and the other is movable under the action of the lever while being in flat contact with the fixed disc in a sliding and sealed manner. Channels are formed as a function of the position of the mobile disc on the fixed disc to allow admission of cold and hot water streams within the cartridge and with a greater or lesser stream, and thus allow their mixing in the formation of a mixed stream.

Some known cartridges may be provided with a separate additional box, which is attached to the cartridge. For example, FR-B-2,876,433 discloses a cartridge for a mixer tap equipped with an additional thermostatic module that is sealingly-coupled to the base of the cartridge. The additional thermostatic module is provided with thermostatic means allowing, when the temperature of the mixed stream exceeds a predetermined threshold value, the blocking of the passage of hot water before entering the cartridge, in order to automatically limit the stream temperature.

However, the space requirement that such an additional module represents may make it difficult for it to be adapted to certain existing mixer taps, which offer limited reception space for the cartridge and the additional module.

WO 2015/086749 A1 discloses a cartridge comprising two intakes of hot and cold water, an outlet chamber, and mixing discs. This cartridge also comprises a thermostatic element with a thermosensitive part disposed in the outlet chamber, and a part that is movable in translation relative to the thermosensitive part and coaxially with a main axis of the cartridge. This known cartridge also comprises a gate valve, connected to the thermosensitive part, in order to provide thermostatic regulation of the temperature of the outgoing water stream. The gate valve is designed to block the passage of cold water and hot water at an outlet chamber located downstream of the mixing discs, and does not allow blocking of the hot water intake located upstream of the mixing discs. This known cartridge does not comprise a hot water intake gate valve. Since the translation axis of the gate valve is coaxial with the axis of the cartridge, the thermostatic control system represents a relatively large footprint in the lower part of the cartridge.

FR 3 003 046 A1 describes a device comprising a thermostatic control system whose operation is similar to that of WO 2015/086749 A1.

As a result, the invention aims to overcome the disadvantages of the prior art by proposing a new mixing unit which, while easy to manufacture, has sufficient compactness to adapt to most existing mixer taps.

SUMMARY

The invention relates to a mixing unit for a mixer tap having a generally cylindrical shape defining a main axis of the mixing unit, wherein the mixing unit comprises:
  a first intake of a first incoming stream of fluid having a first temperature,
  a second intake of a second incoming stream of fluid having a second temperature greater than the first temperature,
  an outlet for an outgoing stream,
  means for mixing the first and second incoming streams to form the outgoing stream, and
  thermostatic means which comprise:
    a thermostatic element comprising both a thermosensitive part disposed at least partially at the outlet, and a part that can move in translation relative to the thermosensitive part along a shutter axis, and
    a shutter of the second intake connected to the mobile part in translation along the shutter axis,
  According to the invention, a plane orthogonal to the main axis and the shutter axis are secant, wherein the shutter axis is inclined with respect to this orthogonal plane and passes through it.

Thanks to the invention, the thermostatic means are arranged obliquely within the mixing unit, so that the compactness of the mixing unit is improved along the main axis. This compactness is ensured, even though there are both mixing means and thermostatic means for at least partially closing the second intake as a function of the temperature of the outgoing stream.

According to other advantageous features of the invention, taken separately or in combination:
  the shutter axis forms a non-zero inclination angle between −45° and 45° with the orthogonal plane;
  the angle of inclination is between −45° and −10°, or between 10° and 45°;
  the mixing unit comprises a housing, which allows the outlet to communicate with the second intake along the shutter axis, and wherein at least a portion of the thermostatic means is housed, in order to seal off communication between the outlet and the second intake;
  the housing has an insertion end for insertion of the thermostatic means into the housing, wherein the insertion end is disposed on the outlet side, and wherein the mixing unit defines a clearance space of the thermostatic means, through which the thermostatic means may be mounted in the housing by translation of the thermostatic means along the shutter axis until insertion of at least a portion of the thermostatic means within the housing via the insertion end;
  the mixing unit comprises a sealing crown of the mixing unit with a mixer tap body, wherein the sealing crown extends in the orthogonal plane, the thermostatic means being traversed by the orthogonal plane and are surrounded by the sealing crown;

the mixing unit comprises a cartridge containing the mixing means, and an additional casing that is mounted to abut the cartridge and which comprises the thermostatic means and the sealing crown;

the mixing unit comprises a lower face onto the surface of which the first intake and the second intake open, wherein the second intake is extended towards the inside of the mixing unit by a baffle duct comprising a closable portion that may be closed by the gate valve, wherein the closable portion extends substantially coaxially to the shutter axis, and wherein the baffle duct connects the second inlet to the mixing means;

the mixing unit comprises a control member, wherein the mixing means comprise a mixing chamber containing a set of mixing discs made of ceramic, and at least one of which is actuated by the control member, to control the respective flow rate of the first incoming stream and the second incoming stream, and thus adjust both the temperature and the flow rate of the outgoing stream; and the first incoming stream coming from the first inlet and the second incoming stream coming from the second inlet are brought into contact with each other during their passage inside the mixing means in order to be mixed together to form the outgoing stream, wherein the outgoing stream is then discharged via the outlet.

The invention also relates to a mixer tap equipped with a mixing unit as defined above.

BRIEF DESCRIPTION OF THE FIGURES

The invention will be better understood upon reading the description which follows, given solely by way of nonlimiting example and with reference to the drawings, wherein:

FIG. 3 shows a view of a detail of FIG. 1, on a larger scale, according to the frame III;

FIG. 4 shows a perspective view from below of the mixing unit of FIGS. 1 to 3, on which are represented planes I-I and II-II corresponding to the respective sectional planes of FIGS. 1 and 2;

FIG. 5 shows a view similar to that of FIG. 4 wherein an additional housing of the mixing unit is omitted; and FIG. 6 shows a view, similar to that of FIG. 1, of a mixer tap comprising a mixing unit according to a second embodiment according to the invention.

DETAILED DESCRIPTION

Figure 1:
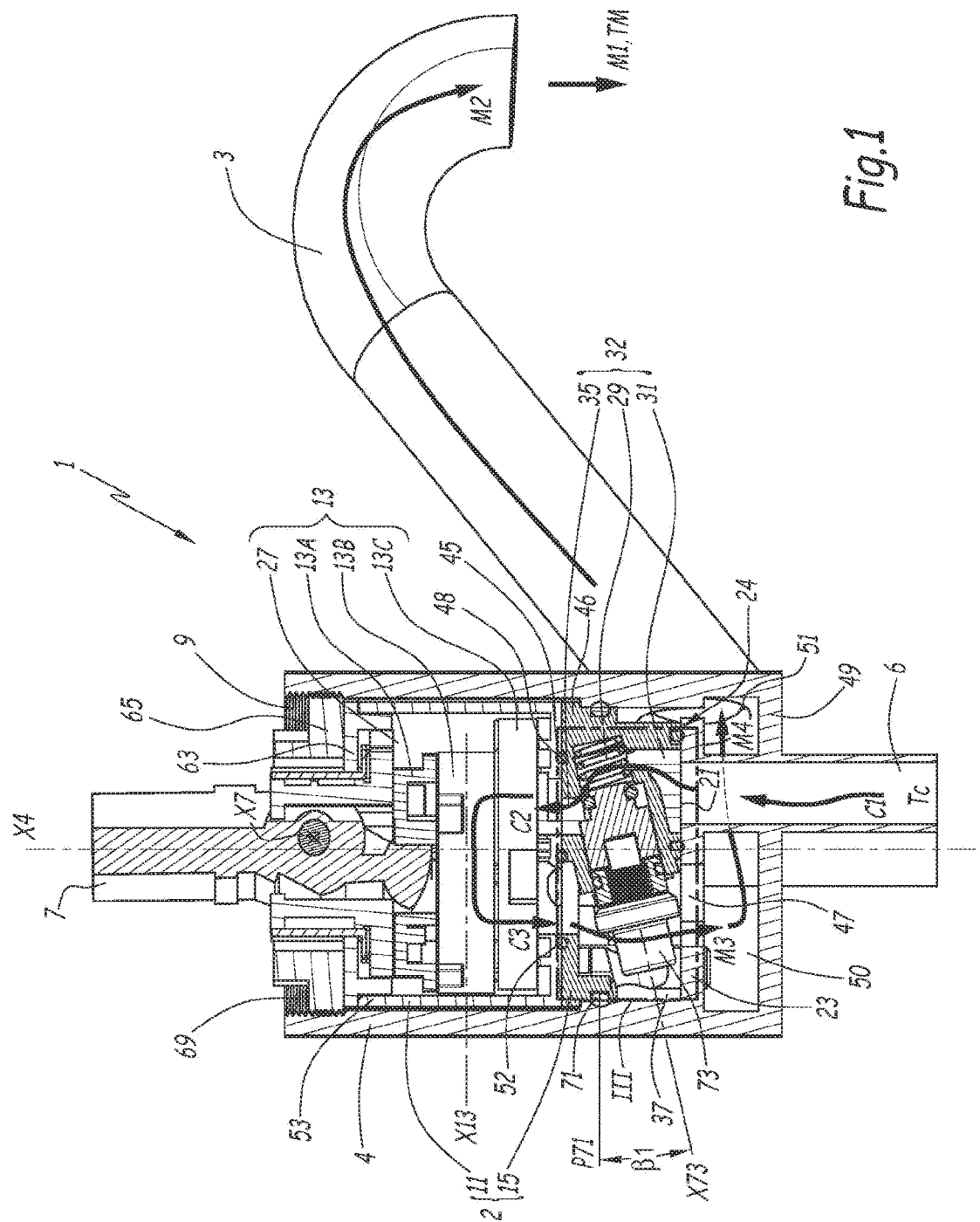
FIGS. 1 and 2 show longitudinal sections of a mixer tap comprising a mixing unit according to a first embodiment according to the invention.
Figure 2:
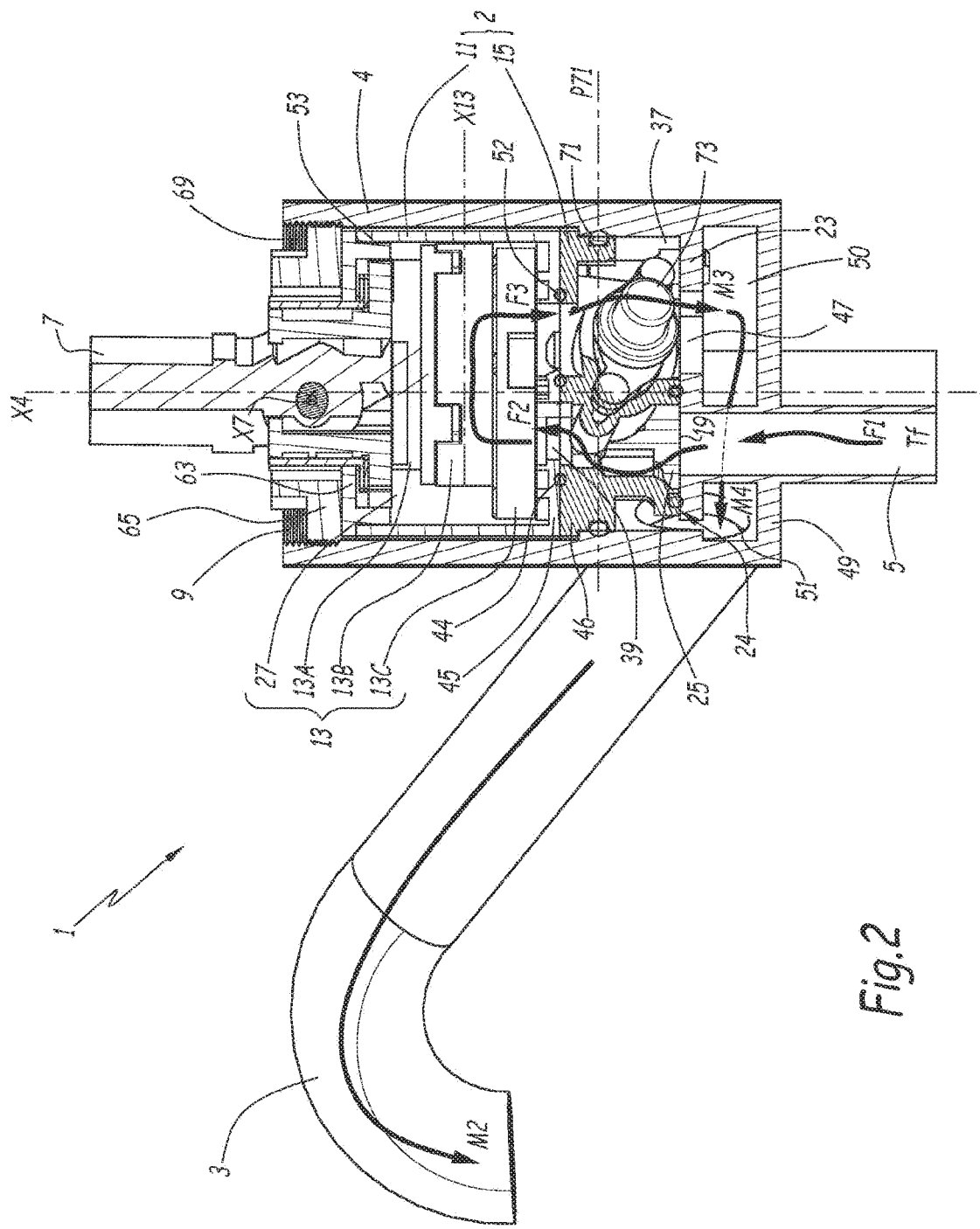

FIGS. 1 and 2 show a mixer tap 1 in which is inserted a mixing unit 2. The mixer tap 1 is preferably designed to be installed on a basin of the sink or shower type, or more generally in a sanitary installation. The mixer tap 1 comprises, in a conventional manner, a spout 3 from which a mixed stream of water illustrated by the arrow M1 is intended to be emitted. The tap 1 also comprises a body 4, which forms a hollow cylinder defining a main axis X4 which is intended to be arranged vertically when the tap is mounted on the sanitary installation.

For convenience, the following description is oriented with respect to the main axis X4, wherein it is considered that the terms "upper" and "top" correspond to an axial direction facing the upper part of FIG. 1, while the terms "lower" and "bottom" correspond to an axial direction in the opposite direction.

As a variant (not shown), the axis X4 is arranged in a direction different from the vertical and may be, for example, horizontal.

The spout 3 forms a curved duct extending upwards and obliquely from the body 4 to the main axis X4, wherein the curvature of the spout 3 guides the stream of mixed water M1 downwards. The mixed stream of water thus progresses obliquely upwards in the spout along the arrow M2 to the open end of the latter.

The mixer tap 1 also comprises a cold water intake 5 which is visible in FIG. 2, and a hot water intake 6 which is visible in FIG. 1, wherein both are connected to the body 4 at a bottom end of the latter. The cold water intake 5 and the hot water intake 6 are intended to be connected to conventional water supply means of the sanitary installation, but which are not described in detail in the present description. The cold water progresses upwards in the intake 5, according to the arrow F1, at a temperature Tf. The hot water progresses upwards in the intake 6, according to the arrow C1, at a temperature Tc. The streams C1 and F1 are mixed within the mixer tap 1 to form the stream M1, at a temperature $T_M$ between Tf and Tc, and the added flow of the streams C1 and F1.

The mixing unit 2 is housed within the body 4, wherein it is inserted into the latter through an upper opening 9 of the body 4 along the main axis X4. It is in this mixing unit 2 that the mixing of the incoming streams F1 and C1 is performed to form the outgoing stream M1.

The mixing unit 2 has a generally cylindrical shape that is coaxial with the main axis X4. On the one hand, the mixing unit 2 comprises a cartridge 11, which contains means 13 for mixing the first incoming stream F1 and the second incoming stream C1 to form the outgoing stream M1, and, on the other hand, an additional casing 15 which comprises an upper wall 46 through which the housing 15 is mounted to bear upwards against a lower wall 45 of the cartridge 11 along the main axis X4. Thus, the cartridge 11 is located in the upper part of the body 4, above the additional casing 15 which is located in the lower portion of the body 4.

The additional casing 15 has a lower face 24 by means of which it is itself supported underneath against a support wall 23 of the body 4. The latter is substantially discoidal and extends radially relative to the main axis X4. The inlets 5 and 6 of the incoming streams F1 and C1 pass through the support wall 23 to supply the additional casing 15 via the lower face 24. In practice, the intakes 5 and 6 are respectively connected, in a sealed manner, to a first intake 19 of the first incoming stream F1, and a second intake 21 of the second incoming stream C1 opening on the surface of the lower face 24.

As shown in FIG. 2, the first incoming stream progresses along the arrow F1 to the first intake 19 and continues its progress through the additional casing 15 from bottom to top along the arrow F2 in a duct 25 traversing the additional casing 15 and extending parallel to the main axis X4 from the first intake 19. The duct 25 guides the first incoming stream F2 to a mixing chamber 27 of the cartridge 11 through the upper wall 46 of the 15. The mixing chamber 27 belongs to the mixing means 13. In parallel, as shown in FIG. 1, the second incoming stream enters the additional casing 15 via the second intake 21, and circulates from the bottom to the top according to the arrow C2 through the additional casing 15 in a baffle duct 32 which generally extends from the bottom to the top from the second intake 21. In this case this baffle duct 32 comprises a first portion 31 that is substantially parallel to the main axis X4 and extends from the second intake 21. The baffle duct 32 then comprises a closable portion 29 that may be closed by a shutter 87 that is described in more detail below, wherein the closable portion 29 is an extension of the first portion 31. Finally, the baffle duct 32 comprises a third portion 35 that is substantially parallel to the main axis X4 and feeds the second incoming stream C2 to the cartridge 11 and extends the closable portion 29. The third portion 35 traverses the upper wall 46 of the casing 15. The closable portion 29 extends obliquely with respect to the first portion 31 and the third portion 35, so that the baffle duct 32 forms an "S". The third portion 35 opens into the mixing chamber 27. Thus, the two incoming streams F2 and C2 are admitted into the mixing chamber 27 of the cartridge 11 in order to be mixed therein and so form an outgoing stream M3 that is intended to form the stream M1.

The mixing chamber 27 comprises one intake 39 for the first stream F2, a second intake 41 for the second stream C2, and an outlet 43 for the outgoing stream M3, as may be seen, in particular, in FIG. 5, in which the additional casing 15 is omitted. The intakes 39, 41 and the outlet 43 open at the surface of the lower wall 45 of the cartridge 11. In this case, the bottom wall 45 is of generally discoidal shape centered on the main axis X4, while the intakes 39 and 41 and the outlet 43 are distributed around the main axis X4. The intakes 39, 41 and the outlet 43 are respectively surrounded by seals 44, 48 and 52 that are mounted on the surface of the bottom wall 45 in order to seal the assembly between the cartridge 11 and the additional casing, by crushing the seals 44, 48 and 52 against the upper wall 46 of the casing 15. According to the flow direction of the stream, the first intake 39 and the second intake 41 are upstream of the mixing means 13, while the outlet 43 is downstream of the mixing means.

In the illustrated example, the mixing means 13 comprise a set of mixing discs 13A, 13B and 13C, which are contained in the mixing chamber 27, as may be seen in FIGS. 1 and 2. The mixing discs 13A, 13B and 13C are in surface contact with each other and extend in planes orthogonal to the main axis X4. The set of mixing discs comprises an upper disc 13A, an intermediate disc 13B and a lower disc 13C, wherein the upper disc 13A and intermediate disc 13B may be moved relative to the disc 13C which is fixed, while the intermediate disc 13B is in sliding contact and sealed with the 13C disc. The intermediate disc 13B and lower disc 13C comprise a system of channels and holes (not shown), which are connected to the intakes 39 and 41 and the outlet 43 and which, as a function of the relative position of the discs 13B and 13C, regulate the respective flow rate of the incoming streams F2 and C2 that are admitted into the set of discs through the intakes 39 and 41. As represented by the arrows F3 and C3, the incoming streams circulate in the system of channels and holes and first traverse the lower disc 13C, then into the intermediate disc 13B. The incoming streams F3 and C3 then flow again through the lower disc 13C from top to bottom. During their passage through the discs 13A, 13B and 13C, the incoming streams F3 and C3 are brought into contact in order to be mixed and form the outgoing stream M3. The outgoing stream M3 is at a temperature $T_M$, while the ratio of the flow rates of the incoming streams F3 and C3 make it possible to adjust the temperature $T_M$, and the value of the flow rates of the incoming streams F3 and C3, thus making it possible to adjust the flow rate of the outgoing stream M3. In practice, the cross-section of the passage of the incoming streams F3 and C3 varies as a function of the relative position of the discs 13B and 13C, by placing the aforementioned channels and holes in communication. The ceramic discs and their channel system are not described in more detail because they constitute well-known mixing means as such, and are described, for example, in FR-B1-2 876 433. It should also be understood that, even if it is preferred to use a mixing chamber with ceramic discs, all known mixing means and cartridges usually used in mixer taps may be used instead.

The outgoing stream M3 that is formed by mixing within the mixing chamber 27 is then discharged out of the latter via the outlet 43, and out of the cartridge 11 into an outlet chamber 37 of the mixer tap 1, wherein it guides the outgoing stream M3 from top to bottom to an outlet 47 formed through the support wall 23. The intakes 5 and 6 and the outlet 47 are distributed around the main axis X4. The additional casing 15 comprises a circular sealing crown 71 which is centered on the main axis X4. In this case, the sealing crown 71 extends in an orthogonal plane P71 relative to the axis X4, and protrudes centrifugally with respect to the axis X4, from the upper wall 46 of the casing 15 so as to be in sealing contact with the body 4. In this case, the sealing crown comprises a circular groove that is radially open outwards and in which is formed a crushed O-ring that is in contact with the body 4 as shown in the figures. The sealing crown 71 thus delimits an upper portion of the outlet chamber 37, while the latter is also delimited laterally by the wall of the body 4, and at the bottom by the support wall 23. As may be seen in FIG. 4 the outlet chamber 37, the through duct 25 and the baffle duct 32 are evenly distributed around the main axis X4. As shown in FIGS. 1 and 2, the outgoing stream M3 is thus discharged into a lower chamber 50 of the body 4 via the outlet 47. The lower chamber 50 is delimited at the top by the wall 23, laterally by the body 4, and below by a bottom 49 of the mixer tap 1. The bottom 49 is substantially discoidal and orthogonal to the main axis X4, and closes the body 4 at the lower end thereof. In the lower chamber 50, the outgoing stream M3 is led, according to the arrow M4, to the spout 3 via an access opening 51 formed radially in the wall of the body 4 relative to the main axis X4, thus bringing the lower chamber 50 in communication with the spout 3. In the spout 3, the outgoing stream M4 becomes the outgoing stream M2, and then the outgoing stream M1, as mentioned above.

The mixing unit 2 further comprises a lever 7 which is movably mounted at the top of the cartridge 11 in order to protrude from the body 4 via the upper opening 9 and allow a user to operate the lever 7. The actuation of the lever 7 makes it possible to control the mixing means 13, and, in particular, to rotate the upper and intermediate discs 13A and 13B about an axis parallel to the main axis X4, or about the axis X4 itself, and in translation along an axis X13 which is orthogonal to the main axis X4. In general, the lever 7 forms a control member for actuating at least one of the discs 13A, 13B and 13C, and may thus control the respective flow rate of the first incoming stream F1 and the second incoming stream C1. Thus, the control member 7 makes it possible to adjust both the temperature and the flow rate of the outgoing stream M1 by adjusting the relative position of the discs of the disc assembly 13A, 13B and 13C. The mixer tap 1 and the cartridge 11 may thus be described as having "single-lever" actuation, insofar as the lever 7 makes it possible to control both the flow rate and the temperature of the outgoing stream M1 by adjusting the flow rates of the incoming streams F1 and C1. In practice, the lever 7:

may pivot about the main axis X4, which causes the upper discs 13A and 13B to rotate about this same axis in order to adjust the ratio between the flow rate of the first and second incoming streams F1 and C1, and therefore the temperature of the outgoing stream M1, and may pivot about a second axis X7, which is orthogonal to the main axis X4, in order to translate the upper discs 13A and 13B along the axis X13, and so vary the flow rate of the first and second incoming streams equitably, and to adjust the outgoing flow rate.

The lever 7 is connected to the set of discs 13A, 13B and 13C, i.e. the mixing means 13, by an actuation mechanism which is not described in more detail, insofar as it is known as such.

The cartridge 11 comprises a cover 53, which forms an outer casing wall of the cartridge 11 that is substantially cylindrical with a circular base about the main axis X4. The cover 53 encloses the mixing means 13 and laterally delimits the chamber 27. The cover 53 also encloses the base of the lever 7, wherein the cartridge comprises a ring 63 that is attached to an upper end of the cover 53 and through which a nut 65, centered on the main axis X4, holds the mixing unit 2 against the support wall 23. In practice, the nut 65 has an external thread which is screwed into an internal thread 69 of the upper opening 9 of the body 4, wherein the thread 69 is centered on the axis X4.

The mixing unit 2 also comprises thermostatic means, visible in particular in FIG. 1, which comprise first of all a thermostatic element 73 extending along a shutter axis X73 shown in the drawing of FIG. 1. The shutter axis X73 and the orthogonal plane P71 intersect. In other words, the shutter axis X73 is inclined with respect to the plane P71 and passes through it. The closable portion 29 of the baffle duct 32 extends substantially coaxially with the shutter axis X73. Preferably, the shutter axis X73 forms an angle of inclination β1 between 10° and 45° with the orthogonal plane P71, and preferably 13°.

As may be seen, in particular, in FIG. 3, along the shutter axis X73, the thermostatic element 73 comprises a thermosensitive portion 75 mounted in a housing 79 of the additional casing 15. The housing 79 is a duct that is coaxial with the shutter axis X73, which is formed in the additional casing 15 in order to connect the outlet chamber 37 and the baffle duct 32. The housing 79 thus brings the outlet 47 into communication with the second intake 21.

The thermosensitive portion 75 forms a fixed part of the thermostatic element 73 and comprises, in particular, along the shutter axis X73, a cup 81 which protrudes from the housing 79 and which extends into the passage of the outgoing stream M3 at the outlet 47. The cup 81 has a generally cylindrical shape with a circular base centered on the shutter axis X73, and encloses a heat-expandable body which is, for example, a suitable wax. As the cup 81 is in contact with the outgoing stream M3, the heat-expandable body expands and contracts as a function of the temperature $T_M$ of the outgoing stream M3.

The thermosensitive portion 75 also comprises a guide 83, which extends the cup 81 along the shutter axis X73, and by means of which the thermosensitive portion 75 is mounted in the housing 79. The guide 83 has the form of a screw with an external thread about the shutter axis X73, and extends at least partially within the housing 79. In this case, the guide 83 is screwed into a support ring 84 provided with an internal thread that is coaxial with the axis X73, while the support ring 84 is itself fixed within an end 90 of the housing 79. The end 90 forms an end portion of the housing 79 that extends from the outlet side 47 that is in contact with the outlet chamber 37. The support ring 84 is partially inserted into the end 90, and has a seal 92 with the housing 79 in order to make the latter waterproof and thus prevent any water transfer from the second stream C2 into the outlet 47 via the housing 79. The support ring 84 is fixed to the housing 79 by means of screw-type fasteners 94 shown schematically in FIG. 4. The fixing elements 94 are located in a wall of the chamber 37, which forms the periphery of the end 90. The thermostatic element 73 is thus housed in the housing 79 in order to tightly close communication between the outlet 47 and the second inlet 21.

The thermostatic element 73 also comprises a mobile portion 77, which forms a cylindrical piston that is coaxial with the shutter axis X73. The mobile portion 77 is mounted within the guide 83 in order to be translatable away from the thermosensitive portion 75 relative to the thermosensitive portion 75, and in the direction of the baffle duct 32, along the shutter axis X73 under the action of the thermo-expandable body contained in the cup 81.

A shutter 87 that belongs to the thermostatic element 73 is provided within the closable portion 29, and is designed to be displaced in translation along the shutter axis X73 by the mobile part 77. The shutter 87 is arranged relative to the movable portion 77 so that the latter may push the shutter 87 to a position to close the second intake 21, wherein a seal 26 of the shutter 87, formed by, for example, an outer O-ring, closes the closable portion 29. In this case, the mobile portion 77 is in contact with the shutter 87 in order to push the shutter 87 away from the thermosensitive portion 75 in a direction D1 that is parallel to the axis X73, under the action of the heat-expandable body contained in the cup 81. Due to the inclination of the axis X73 relative to the plane P71, the thermostatic element 73 is further away from the mixing means 13 than is the shutter 87.

The shutter 87 is compressed between the free end of the mobile portion 77 and a return spring 89. The latter is itself compressed between the shutter 87 and an opposite wall 28 of the closable portion 29 of the baffle duct 32. The opposite wall 28 extends in a plane orthogonal to the axis X73. The return spring 89 is therefore a compression spring, designed to return the shutter 87 in a direction D2 opposite to D1, to an open position of the baffle duct 32 and thus the second intake 21.

The shutter 87 is therefore designed to close the second intake 21 by closing the closable portion 29, according to a variable degree of closure as a function of the expansion of the heat-expandable body, and therefore the temperature $T_M$, in order to vary the flow rate of the second incoming stream C2 accordingly. When the temperature $T_M$ reaches a predetermined threshold, for example 50° C., the stream C2 is totally, or at least partially, interrupted by closing off the second intake 21. The thermostatic means, and, in particular, the shutter 87, constitute a means that are separated from the mixing means 13 described above. The thermostatic means advantageously have a safety anti-burn function to reduce or cut off the incoming stream C2 when the outgoing stream M3 has too high a temperature.

The mixing unit 2 is designed to be inserted into the body 4 of the mixer tap 1 via the upper opening 9. Prior to this step of inserting the unit 2, the outlet chamber 37 is open and forms a clearance space because of the absence of the body 4 of the mixer tap 1. The mounting of the thermostatic element 73 may be effected by insertion of the latter into the housing 79 in the direction D1 at the end 90, which is therefore the "insertion end". Preferably, the clearance space of the chamber 37 is so shaped that the thermostatic element 73, the shutter 87 and the spring 89 may be placed in this clearance space along the axis X73, and then pushed in the direction D1 in order to be inserted in the housing 79 by the insertion end 90, without requiring separation of the additional casing 15 and the cartridge 11. This configuration of the chamber 37 is made possible by the inclination of the axis X73 relative to the plane P71, thanks to which the thermostatic means pass by the sealing crown 71 when they are translated along the axis X73 in the chamber 37. Without this inclination of the axis X73, the sealing crown 71 would oppose the free movement of the aforementioned thermostatic means along the axis X73 within the chamber 37. It should be understood that the angle of inclination β1 of the axis X73 relative to the plane P71 is chosen so that the sealing means do not interfere with the sealing crown 71. A notch 72, visible in FIGS. 3 and 4, is formed in the sealing crown 71 at a point of the circumference of the latter. This notch 72 has a cylindrical profile that is coaxial with the axis X73, and has a radius DR. The radius DR is greater than the radial bulk, i.e. the maximum radius relative to the axis X73 of the thermostatic means. When the aforementioned thermostatic means are mounted within the housing 79, they are traversed by the plane P71 and surrounded by the sealing crown 71. In general, to allow the clearance of the thermostatic means, it is expected that the clearance space extends at least cylindrically coaxial with the axis X73, starting at the insertion end 90 towards the outlet chamber 37 and having a radius equal to the radius DR.

Finally, the inclination of the axis X73 implies that the sealing crown 71 may be placed at a relatively small distance from the lower face 24, despite the bulk of the thermostatic means and the constraints related to their mounting within the mixing unit 2. Thus, this mixing unit 2 is particularly compact and is adapted to the geometry of the existing mixer taps.

In a non-illustrated variant, the inclination of the axis X73 with respect to the plane P71 is such that the thermostatic element 73 is less distant from the mixing means 13 than the shutter 87. In this case, the angle β1 is for example between −45° and −10°, preferably −13°. In other words, a disposition opposite to that shown in FIGS. 1 to 5 is adopted for the thermostatic element 73 and the shutter 87, so that the plane P71 and the axis X73 intersect. Thus, in this variant, the inclination of the axis X73 with respect to the plane P71 also implies that the sealing crown 71 may be placed at a relatively small distance from the lower face 24.

In general, the angle β1 is preferably between −45° and 45°, while being non-zero.

FIG. 6 shows a mixing unit 102 according to a second embodiment and having similar characteristics with the mixing unit 2 of the first embodiment described above and shown in FIGS. 1 to 5, wherein these similar characteristics are designated by an identical tracing in the drawing, and/or reference numbers increased by 100. The following description is therefore centered on the differences between the first and the second embodiment.

Like the mixing unit 2, the mixing unit 102 comprises a first intake for a first incoming stream (not visible in FIG. 6), as well as intakes 121 and 141 for a second incoming stream C2, a baffle duct 132 with a closable portion 129, mixing means 113 to form an outgoing stream M3, an outlet 143 with an outlet chamber 137, and a housing 179. The mixing unit 102 also comprises a control member 107, thermostatic means comprising, on the one hand, a thermostatic element 173 comprising both a thermosensitive portion 175 and a mobile portion 177, and, on the other hand, a shutter 187, with a return spring 189. The mobile portion 177 is movable in translation with respect to a shutter axis X173 that is secant with respect to a plane P171 and orthogonal with respect to a main axis X104 defined by the generally cylindrical shape of the mixing unit 102. The plane P171 and the axis X173 define an angle of inclination β101. The mixing unit 102 comprises a sealing crown 171 with a body 4 of the mixer tap 1, wherein the sealing crown extends in the plane P171 and protrudes centrifugally with respect to the main axis X104.

The mixing unit 102 is integrated in the same body 4 of the mixer tap 1 as that of FIGS. 1 to 5. The mixing unit 102 comprises a cartridge 111 and an additional casing 115. Unlike the mixing unit 2, the additional housing 115 of the mixing unit 102 is integral with the cartridge 111, or is at least permanently attached to the cartridge 111. Thus, the mixing unit 102 comprises a single part 145 replacing both a lower wall 45 and the upper wall 46 of the mixing unit 2. The part 145 also forms, in one piece, a cover 153 of the cartridge 111, the sealing crown 171, and the baffle duct 132, the outlet chamber 137 and the through duct, not visible in FIG. 6. The mixing unit 102 is thus particularly easy to manufacture, to the extent that it is not necessary to proceed with the assembly of an additional casing on a cartridge, which dispenses with the use of seals of the kind of the seals 44, 48 and 52 of the mixing unit 2. This part 145 may be obtained for example by molding. The assembly of the thermostatic means within the mixing unit 102 may be carried out as in the case of the unit 2, thanks to the inclination of the axis X173, which allows cleaning a clearance space under the sealing crown 171.

Water streams are implemented in the above. However, other fluids may be used instead of water, preferably liquid fluid streams. In general, the intake 5 corresponds to an intake of a first incoming stream F1 of fluid having a first temperature Tf, whereas the intake 6 corresponds to an intake of a second incoming stream C1 of fluid having a second temperature Tc which is higher than the first temperature Tf. The fluids of the first incoming stream F1 and the second incoming stream C1 are preferably identical and liquid, but may, however, be of a different nature. The water escaping from the spout 3 thus corresponds to an outgoing stream M1 of fluid, which is formed by mixing the first and second incoming stream F1 and C1 within the mixer tap 1.

The embodiments and variants defined above may be combined to create new embodiments.

The invention claimed is:

1. A mixing unit for a mixer tap, having a generally cylindrical shape defining a main axis of the mixing unit, wherein the mixing unit comprises:
　　a first intake of a first incoming stream of fluid having a first temperature,
　　a second intake of a second incoming stream of fluid having a second temperature greater than the first temperature,
　　an outlet for an outgoing stream,
　　a mixer mixing the first and second incoming streams to form the outgoing stream, and
　　a housing which brings the outlet into communication with the second intake along a shutter axis, the housing having an insertion end disposed on the outlet side;
　　a thermostatic unit comprising:
　　　　a thermostatic element, housed in the housing in order to tightly close the communication between the outlet and the second inlet and comprising: a thermosensitive portion disposed at least partially at the outlet and a mobile portion, which is mobile in translation relative to the thermosensitive portion along the shutter axis, and
　　　　a shutter connected to the mobile portion in translation along the shutter axis for closing the second intake;

wherein the mixing unit defines a clearance space for the thermostatic unit, by means of which the thermostatic unit may be mounted into the housing via the insertion end, by translation of the thermostatic unit along the shutter axis until insertion of the thermostatic element into the housing through the insertion end, and wherein a plane that is orthogonal to the main axis and the shutter axis intersect, wherein the shutter axis is inclined relative to the orthogonal plane, and passes through it.

2. The mixing unit according to claim 1, wherein the shutter axis forms a non-zero angle of inclination between −45° and 45° with the orthogonal plane.

3. The mixing unit according to claim 2, wherein the angle of inclination is between −45° and −10° or between 10° and 45°.

4. The mixing unit according to claim 1, wherein the mixing unit comprises a sealing crown of the mixing unit with a body of mixer tap, wherein the sealing crown extends in the orthogonal plane, the thermostatic unit being traversed by the orthogonal plane and surrounded by the sealing crown.

5. The mixing unit according to claim 4, wherein the mixing unit comprises a cartridge, enclosing the mixer, and an additional casing, which abuts the cartridge and which comprises the thermostatic unit and the sealing crown.

6. The mixing unit according to claim 1, wherein the mixing unit comprises a lower face onto which the first intake and the second intake open, wherein the second intake extends towards the inside of the mixing unit through a baffle duct comprising a closable portion that may be closed by the shutter, wherein the closable portion extends substantially coaxially with the shutter axis, while the baffle duct connects the second intake to the mixer.

7. The mixing unit according to claim 1, wherein the mixing unit comprises a control member, wherein the mixer comprises a mixing chamber enclosing a set of mixing discs made of ceramic, and at least one of which is actuated by the control member to control the respective flow rate of the first incoming stream and the second incoming stream and thus adjust both the temperature and the flow of the outgoing stream.

8. The mixing unit according to claim 1, wherein the first incoming stream from the first intake and the second incoming stream from the second intake are brought into contact during their passage within the mixer in order to be mixed and form the outgoing stream, wherein the outgoing stream is then discharged via the outlet.

9. The mixer tap equipped with a mixing unit according to claim 1.

* * * * *